Nov. 25, 1924.
E. M. COLE
1,516,954
FERTILIZER DISTRIBUTOR
Filed Sept. 26, 1919
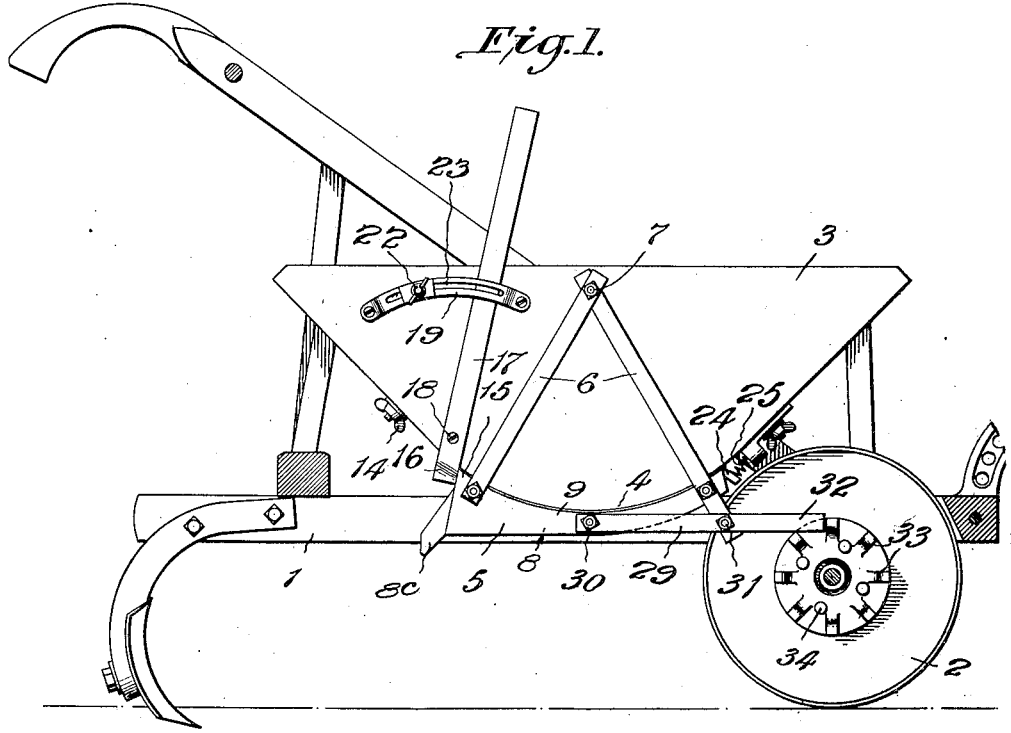
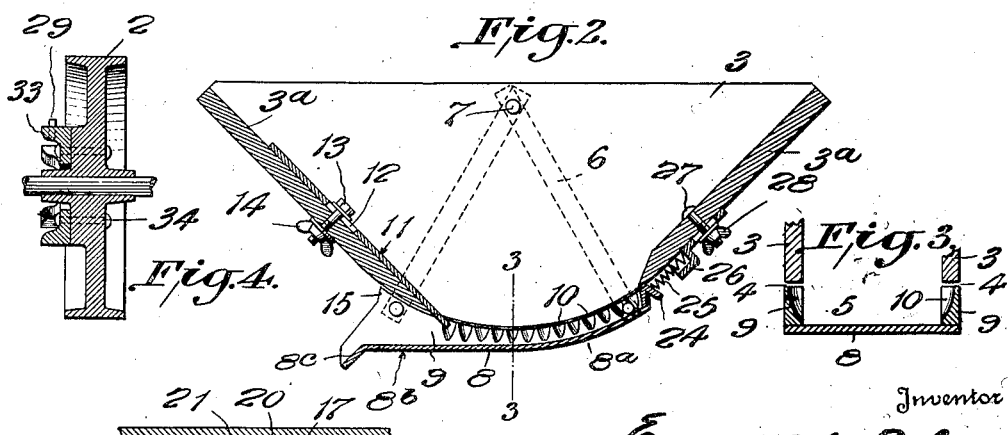

Patented Nov. 25, 1924.

1,516,954

UNITED STATES PATENT OFFICE.

EUGENE M. COLE, OF CHARLOTTE, NORTH CAROLINA.

FERTILIZER DISTRIBUTOR.

Application filed September 26, 1919. Serial No. 326,455.

*To all whom it may concern:*

Be it known that I, EUGENE M. COLE, a citizen of the United States, residing at Charlotte, in the county of Mecklenburg and State of North Carolina, have invented certain new and useful Improvements in Fertilizer Distributors, of which the following is a specification.

This invention relates to fertilizer distributors and more particularly to devices of this character designed to distribute fertilizer or the like along a single row.

The objects of the invention are to provide an exceptionally simple and efficient feeding device for a distributor of this character, which will handle both fine and coarse material, which will deliver such material uniformly and which will not be liable to become clogged. It is also an object of the invention to provide improved means for preventing the operation of the feeding device while the distributor is being transported from place to place about a farm.

In order that the invention may be readily understood reference is had to the accompanying drawings forming part of this specification and in which—

Fig. 1 is a side elevation of my improved fertilizer distributor complete, parts being in section;

Fig. 2 is a vertical central section through the hopper and associated parts;

Fig. 3 is a transverse section on the line 3—3 of Fig. 2;

Fig. 4 is a transverse section through the ground wheel, and

Fig. 5 is a plan view of the adjustable lever locking device, parts being in section.

Referring to the drawings in detail 1 designates a frame of any suitable construction, in which is journalled the ground wheel 2. This may be of any desired type, but is shown as a plain disk wheel with a wide flange.

The hopper is also rigidly mounted on the frame 1 at the rear of the wheel 2 and comprises a pair of tapering side walls 3, preferably parallel, and inclined end walls 3ª.

Associated with the hopper is a movable bottom 5, which acts also as the feeding or discharging device. This bottom 5 comprises a floor or bottom proper 8 and side flanges 9 as clearly shown in Fig. 3. The bottom is pivotally supported by means of a pair of links 6 on each side about bolts or pins 7, passing through the side walls of the hopper. The flanges 9 of the bottom are disposed in the same planes as the side walls 3 of the hopper, as shown in Fig. 3, and the meeting edges of the side walls and flanges are cut on concentric arcs, as indicated at 4 of which arcs the pivot pins 7 are the center. It is obvious, therefore, that the bottom is free to swing or oscillate beneath the hopper about the pivot pins 7.

In order to prevent the tendency of the material in the hopper to escape through the crack or space 4 between the flanges 9 and side walls 3, I provide the inside of the flanges 9 with a series of inclined tapering notches 10 forming triangular teeth between them. The action of these notches and teeth is to work the material away from the side flanges toward the center of the bottom and thus prevent it from jamming into or escaping from the cracks 4.

As will be seen from an inspection of Fig. 2 the forward or right hand portion 8ª of the floor 8 of the bottom is curved to conform with the lower edge of the hopper. The rear or left hand portion 8ᵇ of said floor is, however, disposed at a tangent to the arc shaped portion 8ª, and is thereby spaced from the end wall 3ª of the hopper to provide a delivery outlet. The size of this outlet can be regulated as desired by means of an adjustable slide 11, having a slot 12 through which works a bolt 13 set into the end wall of the hopper and provided on the outside with a wing nut 14. At the extreme rear, the bottom 5 is provided with a discharge chute 8ᶜ.

The rear upper corner 15 of one of the flanges 9 is shaped to engage the lower end 16 of a stop lever 17 pivoted at 18 to the side of the hopper, the end 16 being slightly offset inwardly, so as to lie in the plane of the flange 9. This lever 17 is embraced by a keeper 19 secured to the side of the hopper and preferably having a serrated inner face 20. Adapted to co-operate therewith is an adjustable catch 21, secured by means of a bolt and wing nut 22, such bolt passing through a slot 23 formed in the keeper. By loosening the nut 22, it will be obvious that the catch 21 may be adjusted along the keeper to any desired point and then clamped in position. The lever 17 is so shaped that it has a tendency to spring outwardly against the keeper, and when placed in the catch 20 it will be held in engagement therewith by its own resilience.

At the opposite end of the bottom 5 is provided a lug 24 against which bears one end of a helical spring 25, the other end of which fits within an adjustable socket 26 which is clamped in position by means of a bolt 27 passing through the end walls of the hopper and provided with a wing nut 28. By shifting the socket 26 the tension of the spring 25 may be adjusted, as will be obvious.

Rigidly secured to the bottom 5 and extending forwardly therefrom is an arm 29. This may be conveniently attached by means of a bolt 30, passing through one of the side flanges 9 and a bolt 31 passing through the extended end of one of the links 6, it being understood that the bottom 5, links 6 and arm 29 thus form a rigid structure.

The forwardly projecting end 32 of the arm 29 is disposed in the path of a series of lugs 33 carried by the ground wheel 2. These lugs may be formed integral with the wheel or attached in any suitable way, but are shown as being formed on a separate disk which is secured to the wheel hub by means of bolts 34.

From the above it will be obvious that as the wheel 2 revolves, due to its contact with the ground, the lugs 33 will periodically lift the forward end of lever 29 thus swinging the bottom 5 forwardly about its pivots 7, compressing the spring 25. As each lug passes out from under the lever 29, the spring 25 will suddenly throw the bottom 5 rearwardly, such rearward movement being suddenly arrested by engagement of the corner 15 with the end 16 of the stop lever. This impact or sudden stopping of the bottom will cause the material resting thereon to move rearwardly under its own momentum and be discharged from the chute 8$^c$. Thus as the distributor is drawn along, the bottom 5 is continuously oscillated, thereby uniformly discharging material from the chute. It will be noted that the bottom is moved positively by the lugs 33 in one direction and is moved suddenly in the other direction by the spring 25 with a snap action. I have found that this character of oscillation is very effective for feeding both fine and coarse material. The curved forward portion 8$^a$ of the bottom tends to cause the material to flow rearwardly, while the straight tangential rear portion 8$^b$ permits the material to escape freely. Owing to the fact that the pivot point 7 is directly above the open lower end of the hopper, and the bottom curved as described, it will be seen that the portion of the bottom immediately below the pivot point, or in other words, adjacent the center of the hopper, always lies in substantially the same horizontal plane, as the bottom oscillates. It has been found in practice that there is no tendency for the material to pack or jam at the forward end of the bottom or to escape therefrom, but that the shape of the bottom, together with the location of the pivot therefor and the oscillation thereof at different speeds for different parts of the stroke, tend to agitate and loosen up the material in the hopper and to cause the same to be discharged freely in a uniform stream from the rear end or chute.

When it is desired to transport the distributor, as from one field to another, the lever 17 is swung rearwardly and engaged with the catch 21. This causes the end 16 of the lever to shift the bottom 5 forwardly to such an extent that the end 32 of the arm 29 is lifted clear of the lugs 33 and out of the path thereof. The wheel 2 is then free to roll without actuating the feeding mechanism. The same lever, therefore, acts as a stop during the normal operation of the distributor and also as a means for throwing the feeding mechanism out of gear when desired.

It is thought that the extreme simplicity and many advantages of my improved distributor will be readily appreciated by those skilled in the art, without further discussion.

What I claim is:

1. In a fertilizer distributor, a hopper having an opening at its lower end, a movable bottom supported below said opening and having a discharge end, the portion of said bottom adjacent the discharge end lying normally in an approximately horizontal plane, means for shifting said bottom substantially longitudinally of itself while slightly angularly displacing the same and maintaining all portions thereof at a constant distance from a fixed point, resilient means for forcibly moving said bottom in a reverse sense, and means for suddenly arresting such motion as the bottom approaches its initial position.

2. In a fertilizer distributor, a hopper, a bottom pivotally supported so as to swing bodily in the arc of a circle below said hopper about a single center located above the same adjacent the top of the hopper, and means for oscillating said bottom about such center.

3. In a fertilizer distributor, a hopper having an opening at its lower end, a movable bottom disposed below said opening, said bottom being arc shaped in part and means for pivotally supporting said bottom to oscillate about a single axis passing through the center of curvature of such arc and located directly above said opening.

4. In a fertilizer distributor, a hopper having its lower end open, a bottom member pivotally supported so as to swing in the arc of a circle beneath and closely adjacent the lower open end of the hopper, and means for oscillating said bottom member about its pivot, the edges of the side walls of the lower end of the hopper and the adjacent portions of said bottom member being cut on arcs concentric with each other and with such pivot.

5. In a fertilizer distributor, a hopper, a bottom pivotally supported so as to swing in the arc of a circle beneath said hopper, and means for oscillating said bottom about its pivot, a portion of said bottom adjacent one end being bent in an arc concentric with said pivot, and a portion adjacent the other end being disposed in tangential relation to the arc shaped portion.

6. In a fertilizer distributor, a hopper having side walls, a pivotally supported oscillatory bottom therefor, having lateral flanges disposed in the planes of said side walls, the adjacent edges of said side walls and flanges being cut on concentric arcs, of which the pivot of the bottom is the center.

7. In a fertilizer distributor, a hopper having side walls, a pivotally supported oscillatory bottom therefor, having lateral flanges disposed in the planes of said side walls, the said flanges being provided with means tending to prevent the escape of material between the flanges and side walls of the hopper.

8. A fertilizer distributor comprising a hopper, a movable bottom below the same and having a discharge end, means for supporting said bottom to swing in the arc of a circle about a single pivot located above the same, the said bottom and the lower end of said hopper having complementary concentric arcuate portions of which said pivot is the center, positive means for shifting said bottom in one direction, resilient means for forcibly moving it in the other direction, and means for suddenly arresting such motion as the bottom approaches its initial position.

9. A fertilizer distributor comprising a hopper, a movable bottom therefor having a discharge end and hinged to the hopper at a point above its own plane to swing bodily in the arc of a circle, positive means for moving said bottom relative to the hopper, and resilient means for forcibly returning the bottom into jarring contact with a stationary element.

10. A fertilizer distributor comprising a hopper, a movable bottom below the same and having a discharge end, means for supporting said bottom to swing in the arc of a circle about a single pivot located above the same, means for positively shifting said bottom in one direction, resilient means for forcibly moving it in the other direction, and means for suddenly arresting such motion as the bottom approaches its initial position.

11. In a fertilizer distributor, a hopper having an opening at its lower end, a movable bottom therefor having a discharge end and supported to swing beneath said opening about a single pivot located above said opening, means for periodically shifting said bottom relative to the opening in the hopper, and resilient means for forcibly moving the bottom back into jarring contact with means in the path of movement of said bottom.

12. A fertilizer distributor comprising a hopper open at its lower end, a movable bottom supported below the same to swing bodily about a single pivot, said bottom having a portion adjacent its forward end shaped to conform to the arc of a circle concentric with said pivot, and having a portion adjacent the other or rear end disposed in tangential relation to the arc shaped portion, such tangential rear portion constituting the discharge end of the bottom, means for positively moving said bottom forwardly, and resilient means for forcibly returning the bottom into jarring contact with a stationary element, whereby the material in the hopper is discharged from the tangential rear end of the bottom.

In testimony whereof I affix my signature.

EUGENE M. COLE.